(12) United States Patent  
Sakai et al.

(10) Patent No.: US 11,708,041 B2  
(45) Date of Patent: Jul. 25, 2023

(54) VEHICLE AND PASSENGER TRANSPORTATION SYSTEM

(71) Applicant: Toyota Jidosha Kabushiki Kaisha, Toyota (JP)

(72) Inventors: Katsuhiro Sakai, Hadano (JP); Makoto Kawaharada, Shizuoka-ken (JP); Akihide Tachibana, Susono (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 718 days.

(21) Appl. No.: 16/599,390

(22) Filed: Oct. 11, 2019

(65) Prior Publication Data

US 2020/0172036 A1    Jun. 4, 2020

(30) Foreign Application Priority Data

Nov. 29, 2018  (JP) .............................. JP2018-224119

(51) Int. Cl.
| | |
|---|---|
| *B60R 21/015* | (2006.01) |
| *G05D 1/02* | (2020.01) |
| *B60R 11/04* | (2006.01) |
| *B60R 21/00* | (2006.01) |
| *B62D 31/02* | (2006.01) |

(52) U.S. Cl.  
CPC ........ *B60R 21/01538* (2014.10); *B60R 11/04* (2013.01); *G05D 1/021* (2013.01); *B60R 2021/003* (2013.01); *B62D 31/02* (2013.01)

(58) Field of Classification Search  
CPC .............. B60R 21/01538; B60R 11/04; B60R 2021/003; B62D 31/02; G05D 1/021  
See application file for complete search history.

(56) References Cited

U.S. PATENT DOCUMENTS

| | | | |
|---|---|---|---|
| 2017/0237946 A1* | 8/2017 | Schofield ............ | B60C 23/0408 348/148 |
| 2018/0136655 A1* | 5/2018 | Kim ...................... | H04W 4/024 |
| 2020/0160477 A1* | 5/2020 | Ramot ............... | G01C 21/3438 |

FOREIGN PATENT DOCUMENTS

| | | |
|---|---|---|
| CN | 1958424 A | 5/2007 |
| CN | 107918394 A | 4/2018 |
| EP | 1876131 A1 | 1/2008 |
| JP | 04-224433 A | 8/1992 |
| JP | 2000-351547 A | 12/2000 |
| JP | 2006-306558 A | 11/2006 |
| JP | 2007-112560 A | 5/2007 |
| JP | 2008-009761 A | 1/2008 |
| JP | 2010-198504 A | 9/2010 |

* cited by examiner

*Primary Examiner* — Tarek Elarabi  
(74) *Attorney, Agent, or Firm* — Dinsmore & Shohl LLP

(57) ABSTRACT

A vehicle is configured to transport a passenger through autonomous travel. The vehicle includes an in-vehicle camera configured to image the passenger to generate an image, a camera controller configured to control the in-vehicle camera, and a passenger information detection unit configured to detect information about the passenger. The passenger information detection unit measures the number of passengers and the camera controller stops an operation of the in-vehicle camera in a case where the number of passengers is one.

6 Claims, 10 Drawing Sheets

VEHICLE AND PASSENGER TRANSPORTATION SYSTEM

CROSS REFERENCE TO RELATED APPLICATIONS

This nonprovisional application claims priority to Japanese Patent Application No. 2018-224119 filed on Nov. 29, 2018 with the Japan Patent Office, the entire contents of which are hereby incorporated by reference.

BACKGROUND

1. Technical Field

The disclosure relates to a vehicle and a passenger transportation system.

2. Description of Related Art

In the related art, a technique in which an in-vehicle camera is provided in a vehicle and an image captured by the in-vehicle camera is recorded for the purpose of finding the causes of an accident or the like is known. In the case of an in-vehicle environment recording device described in Japanese Unexamined Patent Application Publication No. 2008-009761 (JP 2008-009761 A), the face of an occupant in an image captured by an in-vehicle camera is subjected to a masking process such that the privacy of the occupant is protected.

SUMMARY

Meanwhile, in recent years, a vehicle that can autonomously travel has been developed and various services using such a vehicle are under examination. Examples of the services as described above include a service of transporting a passenger to a destination by using an autonomously traveling vehicle instead of a taxi as usual.

In the case of an autonomously traveling vehicle, the vehicle is not operated by a driver and thus there is no need to use an in-vehicle camera for the purpose of monitoring an operation on the vehicle performed by a driver. Meanwhile, in the case of an autonomously traveling vehicle, a passenger is not monitored by a driver and thus there is a possibility that the safety of the passenger is threatened by a behavior of the passenger acting freely. Therefore, it is conceivable to cause an in-vehicle camera to monitor the passenger at all times in place of a driver.

However, the passenger, who does not have a duty to operate the vehicle, tends to want to be relaxed in the vehicle. Therefore, monitoring the passenger with the in-vehicle camera may violate the privacy of the passenger and make the passenger unpleasant.

The disclosure provides a vehicle and a passenger transportation system with which it is possible to keep a balance between the safety of a passenger and the privacy of the passenger in a case where the passenger is transported by an autonomously traveling vehicle.

The summary of the present disclosure is as follows.

(1) An aspect of the disclosure relates to a vehicle which is configured to transport a passenger through autonomous travel. The vehicle includes an in-vehicle camera, a camera controller, and a passenger information detection unit. The in-vehicle camera is configured to image the passenger to generate an image. The camera controller is configured to control the in-vehicle camera. The passenger information detection unit is configured to detect information about the passenger. The passenger information detection unit measures the number of passengers. The camera controller stops the operation of the in-vehicle camera in a case where the number of passengers is one.

(2) In the vehicle according to (1), the passenger information detection unit may measure the number of users who have issued a vehicle allocation request and are present in the vehicle and the camera controller may stop the operation of the in-vehicle camera in a case where the number of users is one.

(3) In the vehicle according to (1) or (2), the camera controller may stop the operation of the in-vehicle camera in a case where the number of passengers is one and the passenger approves the stoppage of the operation of the in-vehicle camera.

(4) In the vehicle according to any one of (1) to (3), the camera controller may stop the operation of the in-vehicle camera in a case where the number of users is one and the user approves the stoppage of the operation of the in-vehicle camera.

(5) The vehicle according to any one of (1) to (4) may further include an abnormality detection unit configured to detect an abnormality about the vehicle or the passenger and the camera controller may terminate the stoppage of the operation of the in-vehicle camera in a case where the abnormality detection unit detects the abnormality.

(6) In the vehicle according to any one of (1) to (5), the camera controller may transmit an operating state of the in-vehicle camera to the passenger.

(7) In the vehicle according to any one of (1) to (6), the camera controller may cause the image generated by the in-vehicle camera to be displayed to the passenger when the camera controller causes the in-vehicle camera to operate.

(8) Another aspect of the disclosure relates to a passenger transportation system including a server, a vehicle, an in-vehicle camera, a camera controller, and a passenger information detection unit. The server is configured to create a traveling plan based on a vehicle allocation request from a user. The vehicle is configured to autonomously travel based on the traveling plan. The in-vehicle camera is configured to image a passenger of the vehicle to generate an image, the in-vehicle camera being provided in the vehicle. The camera controller is configured to control the in-vehicle camera. The passenger information detection unit is configured to detect information about the passenger. The passenger information detection unit measures the number of passengers. The camera controller stops the operation of the in-vehicle camera in a case where the number of passengers is one.

According to the aspects of the disclosure, it is possible to keep a balance between the safety of a passenger and the privacy of the passenger in a case where the passenger is transported by an autonomously traveling vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
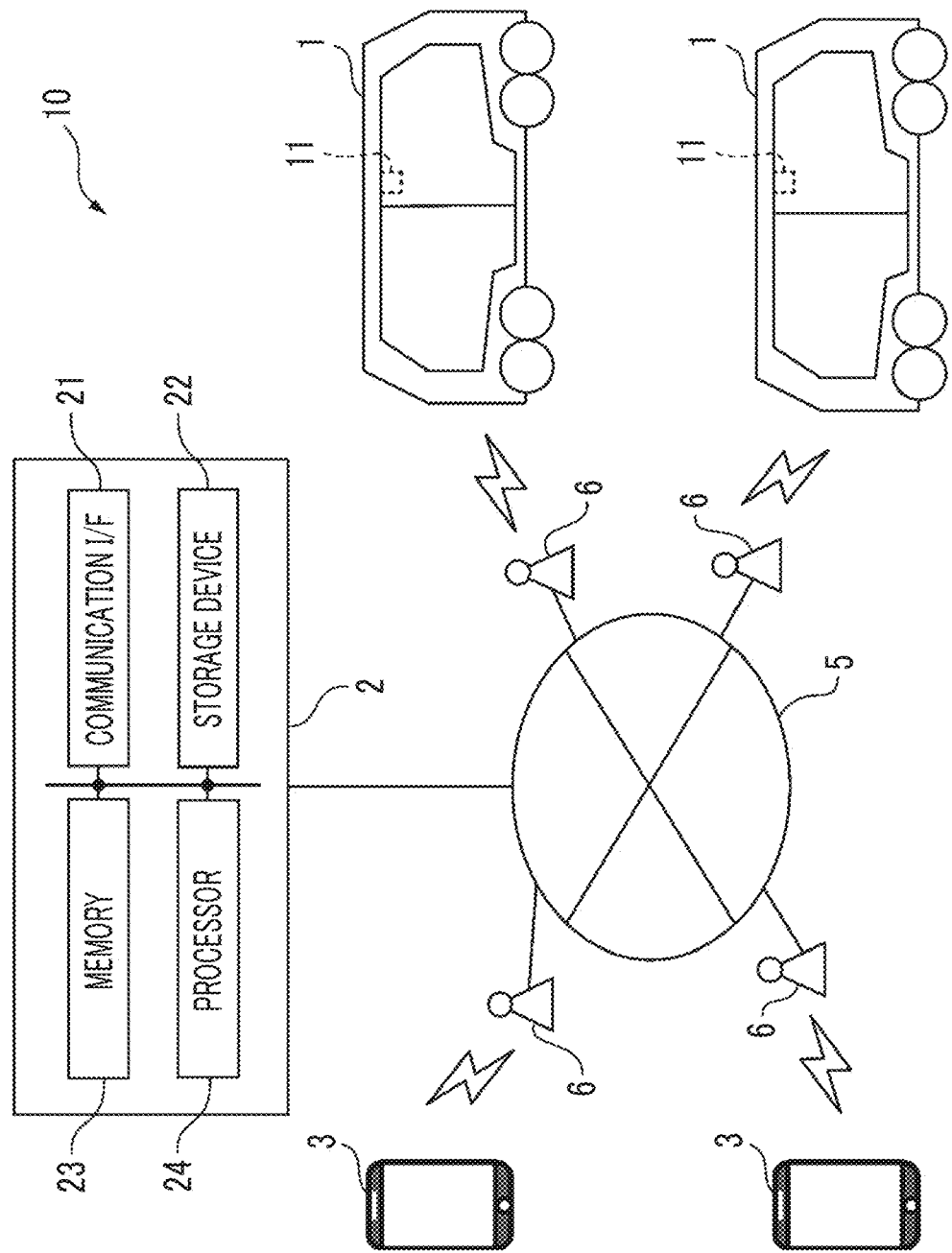
FIG. 1 is a schematic configuration diagram of a passenger transportation system according to a first embodiment of the disclosure.

Hereinafter, embodiments of the disclosure will be described with reference to drawings. In the following description, the same constituent elements will be given the same reference numerals.

First Embodiment

Hereinafter, a first embodiment of the disclosure will be described with reference to FIGS. 1 to 5. FIG. 1 is a schematic configuration diagram of a passenger transportation system according to the first embodiment of the disclosure. A passenger transportation system 10 provides a mobility service such as a carsharing service and a ridesharing service. Specifically, in the passenger transportation system 10, passengers including a user are transported to a desired destination in accordance with a vehicle allocation request from the user by an autonomously traveling vehicle 1. In the case of the ridesharing service, a plurality of users whose destinations are close to each other can use one vehicle 1 at the same time.

As shown in FIG. 1, the passenger transportation system 10 is provided with the vehicles 1, a server 2, and portable terminals 3. The vehicles 1, the server 2, and the portable terminals 3 can communicate with each other. The server 2 receives a vehicle allocation request from the user via the portable terminal 3 of the user and creates a traveling plan based on the vehicle allocation request.

The vehicle 1 is configured to transport a passenger through autonomous travel. The vehicle 1 autonomously travels based on a traveling plan created by the server 2 to transport the passenger to a destination. That is, the vehicle 1 is an automatic drive vehicle which autonomously travels and does not need a driver who operates the vehicle 1. In the case of the mobility service, a plurality of vehicles 1 is used such that a plurality of users can use the service. The vehicle 1 is managed by a service provider who provides the mobility service.

Figure 2:
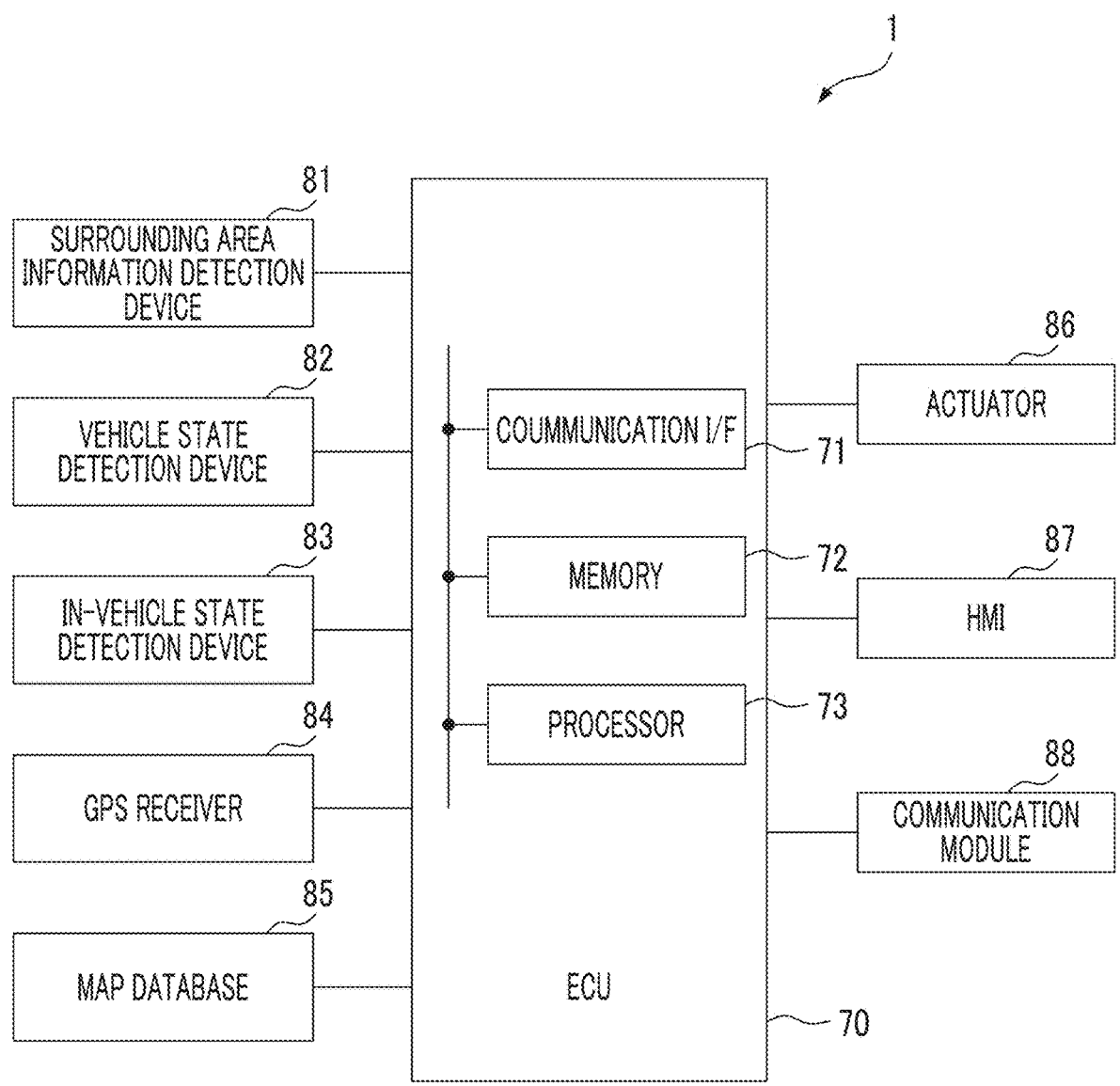
FIG. 2 is a diagram schematically illustrating the configuration of a vehicle.

FIG. 2 is a diagram schematically illustrating the configuration of the vehicle 1. The vehicle 1 is provided with an electronic control unit (ECU) 70. The ECU 70 includes a communication interface 71, a memory 72, and a processor 73 and performs various kinds of control with respect to the vehicle 1. The communication interface 71 and the memory 72 are connected to the processor 73 via a signal line. Note that, although one ECU 70 is provided in the present embodiment, a plurality of ECUs may be provided for each function.

The communication interface 71 includes an interface circuit for connection between an in-vehicle network and the ECU 70, the in-vehicle network conforming to a standard such as a controller area network (CAN). The ECU 70 communicates with another in-vehicle machine via the communication interface 71.

The memory 72 includes, for example, a volatile semiconductor memory (for example, RAM) and a non-volatile semiconductor memory (for example, ROM). The memory 72 stores a program executed in the processor 73, various items of data that are used when various processes are performed by the processor 73, and the like.

The processor 73 includes one or more central processing units (CPUs) and circuits in the vicinity thereof and performs various processes. Note that, the processor 73 may further include a calculation circuit such as a logical calculation unit or a numerical calculation unit.

In addition, the vehicle 1 is provided with a surrounding area information detection device 81. The surrounding area information detection device 81 detects information about an area surrounding the vehicle 1 for autonomous travel of the vehicle 1. The information about an area surrounding the vehicle 1 includes information about a white line on a road, a non-host vehicle, a pedestrian, a bicycle, a building, a mark, a signal, an obstacle, and the like. The surrounding area information detection device 81 is connected to the ECU 70 via the in-vehicle network and the output of the surrounding area information detection device 81 is transmitted to the ECU 70. For example, the surrounding area information detection device 81 includes an out-of-vehicle camera, a millimeter wave radar, a laser imaging detection and ranging (LIDAR) device, an ultrasonic sensor, and the like. The out-of-vehicle camera images the outside of the vehicle 1 to generate an image.

In addition, the vehicle 1 is provided with a vehicle state detection device 82. The vehicle state detection device 82 detects the state of the vehicle 1 for autonomous travel of the vehicle 1. The vehicle state detection device 82 is connected to the ECU 70 via the in-vehicle network and the output of the vehicle state detection device 82 is transmitted to the ECU 70. For example, the vehicle state detection device 82 includes a vehicle speed sensor, a yaw rate sensor, and the like. The vehicle speed sensor measures the speed of the vehicle 1. The yaw rate sensor measures a yaw rate, which is the rotary angular speed around the vertical axis extending through the center of gravity of the vehicle 1.

In addition, the vehicle 1 is provided with an in-vehicle state detection device 83. The in-vehicle state detection device 83 detects the state of the inside of the vehicle 1. For example, the in-vehicle state detection device 83 detects the passenger in the vehicle 1 and detects the passenger getting on or off the vehicle. The in-vehicle state detection device 83 is connected to the ECU 70 via the in-vehicle network and the output of the in-vehicle state detection device 83 is transmitted to the ECU 70. For example, the in-vehicle state detection device 83 includes an in-vehicle camera 11, a seat belt sensor, a sitting sensor, an information reader, and the like.

The in-vehicle camera 11 images the passenger of the vehicle 1 to generate an image. Specifically, as shown in FIG. 1, the in-vehicle camera 11 is disposed on, for example, the ceiling or the like of the vehicle 1 such that the in-vehicle camera 11 images the passenger of the vehicle 1. Note that, the in-vehicle camera 11 may be a plurality of cameras disposed at different positions in the vehicle 1.

The seat belt sensor detects whether the passenger has fastened a seat belt. The sitting sensor detects whether the passenger is seated on a seat. The seat belt sensor and the sitting sensor are provided for each seat. The information reader reads identification information of the portable terminal 3 as user identification information, a QR code (registered trademark) or a password transmitted to the user as vehicle allocation information, card information of a utilization card for use of the mobility service, and the like. The information reader is disposed close to a door of the vehicle 1 and is provided for each seat.

In addition, the vehicle 1 is provided with a GPS receiver 84. The GPS receiver 84 receives signals from three or more GPS satellites and measures the current position of the vehicle 1 (for example, latitude and longitude of vehicle 1). The OPS receiver 84 is connected to the ECU 70 via the in-vehicle network and the output of the GPS receiver 84 is transmitted to the ECU 70.

In addition, the vehicle 1 is provided with a map database 85. The map database 85 stores map information. The map database 85 is connected to the ECU 70 via the in-vehicle network and the ECU 70 acquires the map information from the map database 85. The map information stored in the map database 85 is updated based on data received from the outside of the vehicle 1 and a simultaneous localization and mapping (SLAM) technique or the like.

In addition, the vehicle 1 is provided with an actuator 86. The actuator 86 causes the vehicle 1 to operate. The actuator 86 is connected to the ECU 70 via the in-vehicle network and the ECU 70 controls the actuator 86. For example, the actuator 86 includes a drive device (at least one of engine and motor) for acceleration of the vehicle 1, a brake actuator for braking of the vehicle 1, a steering motor for steering the vehicle 1, a door actuator for opening and closing the doors of the vehicle 1 or controlling a door lock, and the like.

In addition, the vehicle 1 is provided with a human machine interface (HMI) 87. The HMI 87 is an input-output device via which information is input and output between the passenger and the vehicle 1. For example, the HMI 87 includes a display that displays information, a speaker that generates a sound, an operation button or a touch screen via which the passenger performs an inputting operation, a microphone that receives a voice from the passenger, and the like. The HMI 87 provides information (current position of vehicle 1, weather, outside temperature, and like) and entertainment (music, movie, TV program, game, and like) to the passenger of the vehicle 1. The HMI 87 is connected to the ECU 70 via the in-vehicle network, the output of the ECU 70 is transmitted to the passenger via the HMI 87, and input from the passenger is transmitted to the ECU 70 via the HMI 87.

In addition, the vehicle 1 is provided with a communication module 88. The communication module 88 is a machine that enables communication between the vehicle 1 and the outside of the vehicle 1. For example, the communication module 88 includes a data communication module (DCM) and a short-range wireless communication module (for example, WiFi module or Bluetooth (registered trademark) module). The data communication module communicates with the server 2 via a wireless base station 6 and a communication network 5. The short-range wireless communication module directly communicates with the portable terminal 3.

The server 2 is provided outside the vehicle 1 and manages the user and the vehicle 1 to efficiently provide the mobility service. Specifically, the server 2 registers user information, matches the user and the vehicle 1 with each other, creates a traveling plan, and performs the settlement of a utilization fee or the like. The server 2 is managed by a service provider who provides the mobility service.

As shown in FIG. 1, the server 2 is provided with a communication interface 21, a storage device 22, a memory 23, and a processor 24. The communication interface 21, the storage device 22, and the memory 23 are connected to the processor 24 via a signal line. Note that, the server 2 may be further provided with an input device such as keyboard and a mouse, an output device such as a display, and the like. In addition, a plurality of computers may constitute the server 2.

The communication interface 21 includes an interface circuit for connection between the server 2 and the communication network 5. The server 2 communicates with the vehicle 1 and the portable terminal 3 via the communication interface 21.

The storage device 22 includes, for example, a hard disk drive (HDD), a solid-state drive (SSD), or an optical recording medium. The storage device 22 stores various items of data and, for example, stores the user information, vehicle information, map information, and a computer program or the like for the processor 24 to perform various processes. Note that, the computer program may be distributed by being recorded in a recording medium such as an optical recording medium and a magnetic recording medium.

The memory 23 includes, for example, a semiconductor memory such as a random-access memory (RAM). The memory 23 stores various items of data or the like that are used when the processor 24 performs various processes.

The processor 24 includes one or more CPUs and circuits in the vicinity thereof and performs various processes. Note that, the processor 24 may further include a calculation circuit such as a logical calculation unit or a numerical calculation unit.

The portable terminal 3 is possessed by the user and can be moved along with the user. The portable terminal 3 is a machine that can communicate with the server 2 via the wireless base station 6 and the communication network 5. The portable terminal 3 is an input-output device provided with an input device such as a touch panel and a microphone and an output device such as a display and a speaker. The portable terminal 3 is, for example, a smartphone, a tablet terminal, a personal computer, or the like.

Figure 3:
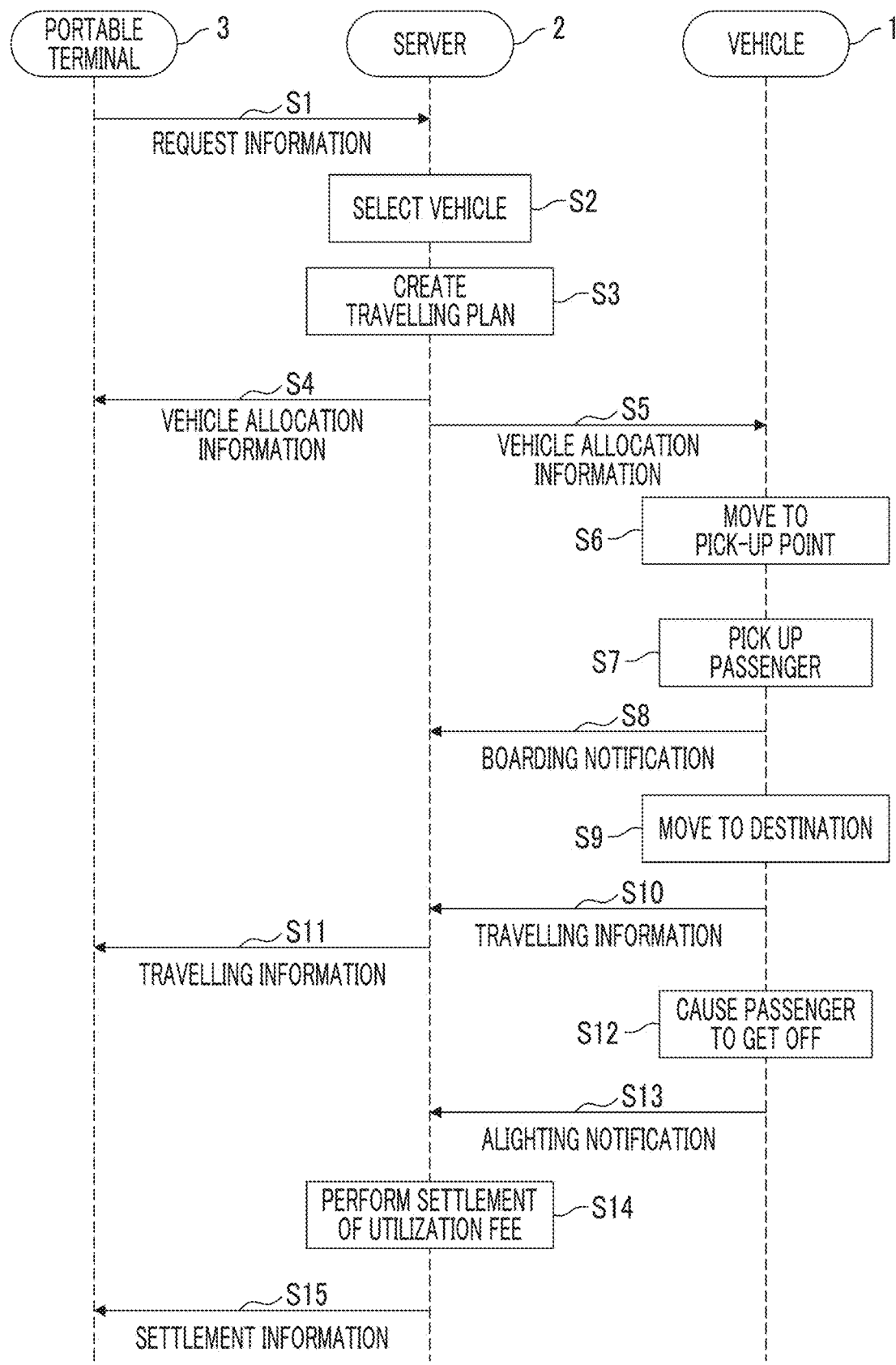
FIG. 3 is a sequence diagram illustrating an example of the operation of the passenger transportation system.

Hereinafter, the flow of the mobility service will be simply described with reference to FIG. 3. FIG. 3 is a sequence diagram illustrating an example of the operation of the passenger transportation system 10. In the sequence diagram, communication between the server 2 and the portable terminal 3 and communication between the server 2 and the vehicle 1 are performed via the communication network 5.

The user who uses the mobility service registers user information in advance by using the portable terminal 3 or the like. The registered user information is stored in the storage device 22 of the server 2 for each user. In a case where the user requests use of the mobility service (that is, in case where user issues vehicle allocation request), the user operates the portable terminal 3 to input request information to the portable terminal 3. The inputting of the request information is performed by an application for the mobility service installed in the portable terminal 3, for example.

When the request information is input to the portable terminal 3, the portable terminal 3 transmits the request information to the server 2 (step S1). The request information includes a pick-up point (for example, current position of user), a destination, user identification information (for example, registration number of user), fellow passenger information (number of passengers or like), information about whether carpooling is allowed or not, and the like. Note that, the pick-up point means a position at which the user wants to get on the vehicle.

When the server 2 receives the request information from the user via the portable terminal 3, the server 2 selects the vehicle 1 suitable for transportation of the user (step S2). That is, the server 2 matches the user and the vehicle 1 with each other. The vehicle 1 suitable for transportation of the user is the vehicle 1 standing by at a position closest to the pick-up point, for example. Note that, in a case where the user allows carpooling, the vehicle 1 which is being used by another user may be selected.

In addition, the server 2 creates a traveling plan for transportation of the user (step S3). The traveling plan includes an expected time of arrival at the pick-up point, a traveling route up to a destination, and an expected time of arrival at the destination.

Next, the server 2 transmits vehicle allocation information to the portable terminal 3 (step S4). The vehicle allocation information transmitted to the portable terminal 3 includes the expected time of arrival at the pick-up point, the traveling route up to the destination, the expected time of arrival at the destination, identification information (number on license plate, vehicle type, color, or like) of the vehicle 1 and information about whether carpooling is performed or not. In addition, the server 2 transmits vehicle allocation information to the vehicle 1 (step S5). The vehicle allocation information transmitted to the vehicle 1 includes the pick-up point, the destination, the traveling route up to the destination, the user identification information, the number of passengers, and the like.

When the vehicle 1 receives the vehicle allocation information from the server 2, the vehicle 1 starts to move to the pick-up point (step S6). Thereafter, the vehicle 1 picks up the passenger (user or user and fellow passenger) after arriving at the pick-up point (step S7).

After the passenger gets on the vehicle, the vehicle 1 notifies the server 2 that the passenger has got on the vehicle. Specifically, the vehicle 1 transmits boarding notification to the server 2 (step S8). In addition, after the passenger gets on the vehicle, the vehicle 1 starts to move to the destination (step S9).

The vehicle 1 transmits traveling information to the server 2 at predetermined time intervals while moving to the destination (step S10). The traveling information transmitted to the server 2 includes the current position of the vehicle 1, information about an area surrounding the vehicle 1, and the like. In addition, the server 2 transmits traveling information to the portable terminal 3 at predetermined time intervals while the vehicle is moving to the destination (step S11). The traveling information transmitted to the portable terminal 3 includes the current position of the vehicle 1, the expected time of arrival at the destination, congestion information of the traveling route, and the like.

Thereafter, when the vehicle 1 arrives at the destination, the vehicle 1 causes the passenger to get off the vehicle 1 (step S12). After the passenger gets off the vehicle 1, the vehicle 1 notifies the server 2 that the passenger has got off the vehicle 1. Specifically, the vehicle 1 transmits alighting notification to the server 2 (step S13).

In addition, the server 2 performs settlement of a mobility service utilization fee after the passenger gets off the vehicle (step S14). For example, the server 2 performs settlement of the utilization fee with an account-to-account transfer or credit card payment, based on the user information stored in the storage device 22 of the server 2. After the settlement of the utilization fee, the vehicle 1 transmits settlement information including the contents of the settlement to the portable terminal 3 (step S15).

As described above, in the vehicle 1 that autonomously travels, no driver is present. Therefore, the passenger of the vehicle 1 cannot be monitored by a driver. As a result, there is a possibility that the safety of the passenger is threatened by a behavior of the passenger acting freely. Therefore, it is conceivable to cause the in-vehicle camera 11 to monitor the passenger of the vehicle 1 at all times in place of a driver. However, the passenger, who does not have a duty to operate the vehicle 1, tends to want to be relaxed in the vehicle 1. Therefore, monitoring the passenger with the in-vehicle camera 11 may violate the privacy of the passenger and make the passenger unpleasant.

In consideration of the above-described fact, it is desirable that monitoring the passenger with the in-vehicle camera 11 is stopped when the level of safety of the passenger is high. With regard to this, in a case where the vehicle 1 is used by one passenger, a possibility that the passenger is harmed due to a cause other than an accident of the vehicle 1 is extremely low. Meanwhile, in a case where the vehicle 1 is used by a plurality of passengers, there is a possibility that the passenger is harmed due to a trouble between the passengers. Therefore, in the present embodiment, the operation of the in-vehicle camera 11 is stopped in a case where the number of passengers of the vehicle 1 is one and the in-vehicle camera 11 is operated in a case where the number of passengers of the vehicle 1 is two or more. In this manner, it is possible to keep a balance between the safety of a passenger and the privacy of the passenger.

Figure 4:
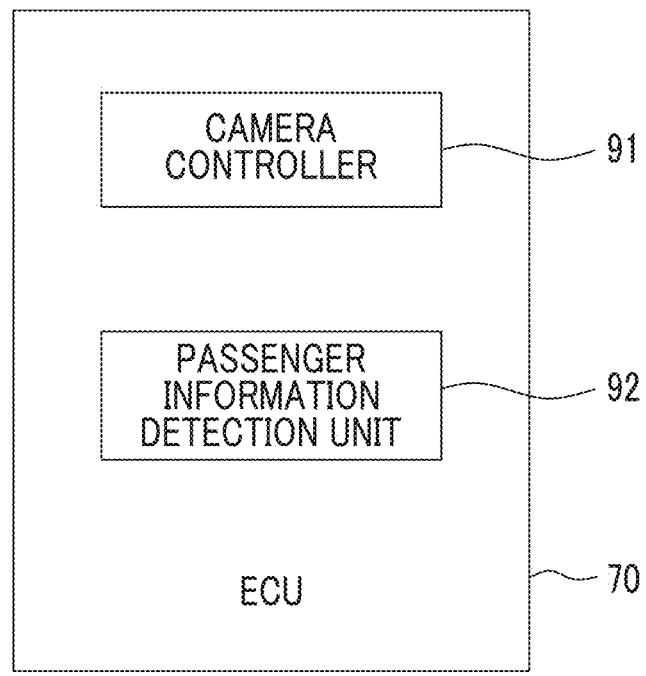
FIG. 4 is a functional block diagram of an ECU of the vehicle according to the first embodiment.

FIG. 4 is a functional block diagram of the ECU 70 of the vehicle 1 according to the first embodiment. In the present embodiment, the ECU 70 includes a camera controller 91 and a passenger information detection unit 92. The camera controller 91 and the passenger information detection unit 92 are functional blocks that are realized when the processor 73 of the ECU 70 executes a program stored in the memory 72 of the ECU 70.

The camera controller 91 controls the in-vehicle camera 11. The passenger information detection unit 92 detects information about the passenger of the vehicle 1. In the present embodiment, the passenger information detection unit 92 measures the number of passengers of the vehicle 1 (hereinafter, referred to as "number of passengers"). The camera controller 91 stops the operation of the in-vehicle camera 11 in a case where the number of passengers is one and causes the in-vehicle camera 11 to operate in a case where the number of passengers is two or more.

Camera Control

Figure 5:
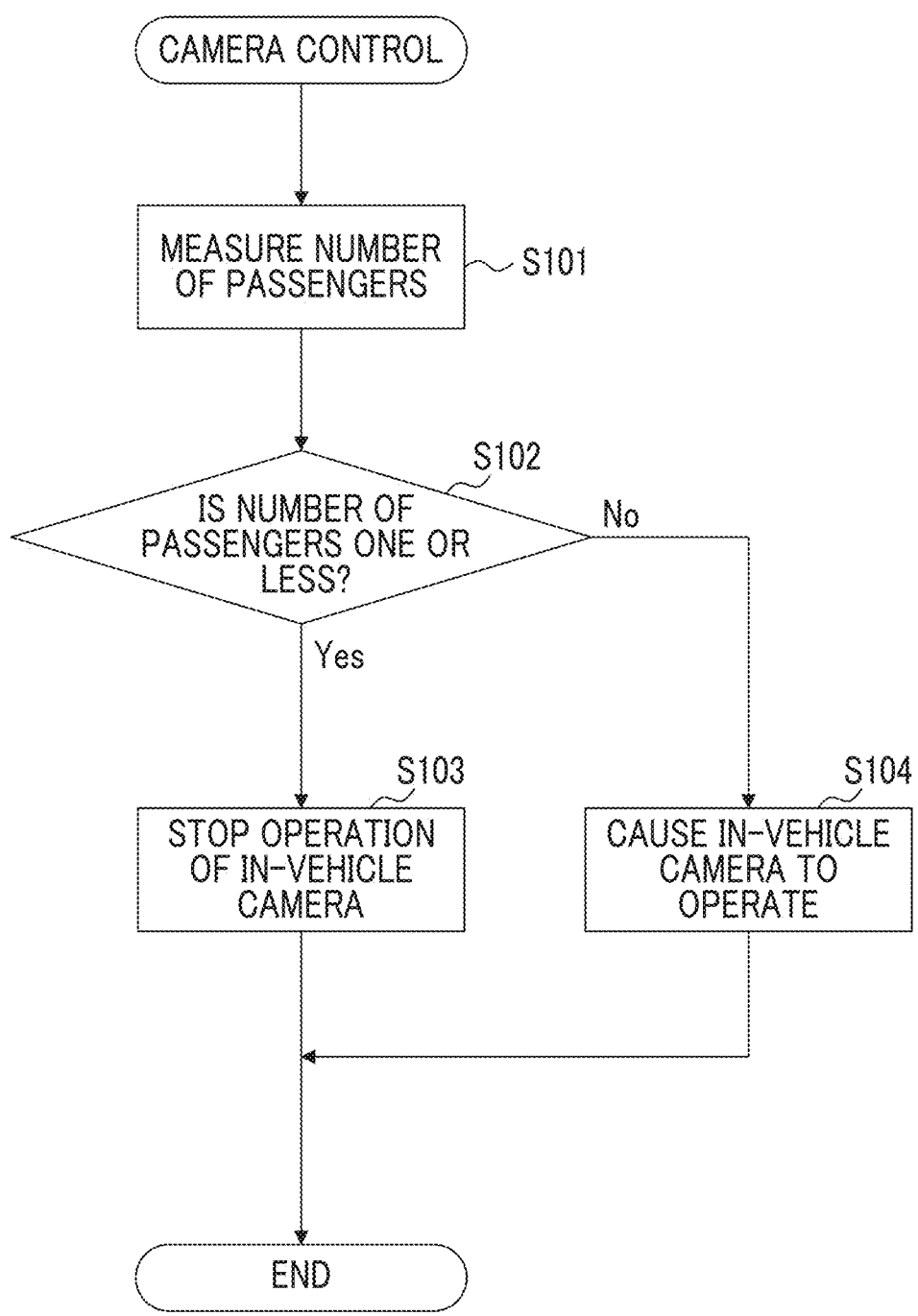
FIG. 5 is a flowchart illustrating a control routine of camera control in the first embodiment.

Hereinafter, control performed on the in-vehicle camera 11 will be described in detail with reference to FIG. 5. FIG. 5 is a flowchart illustrating the control routine of camera control in the first embodiment. The present control routine is repeatedly performed by the ECU 70 at predetermined intervals.

First, in step S101, the passenger information detection unit 92 measures the number of passengers. For example, the passenger information detection unit 92 measures the number of passengers by using the in-vehicle state detection device 83 other than the in-vehicle camera 11. Specifically, the passenger information detection unit 92 measures the number of passengers based on the output of the seat belt sensors or the sitting sensors. In addition, for each user, the pick-up point, the destination, and the number of passengers included in the request information which is input to the portable terminal 3 by the user are transmitted to the vehicle 1 as the vehicle allocation information. Therefore, the passenger information detection unit 92 may measure the number of passengers based on the vehicle allocation information transmitted to the vehicle 1 and the current position of the vehicle 1 which is detected by the GPS receiver 84.

Next, in step S102, the camera controller 91 determines whether the number of passengers measured by the passenger information detection unit 92 is one or less. In a case where the camera controller 91 determines that the number of passengers is one or less, the present control routine proceeds to step S103. In step S103, the camera controller 91 stops the operation of the in-vehicle camera 1. That is, the camera controller 91 does not cause the in-vehicle camera 11 to operate. For example, the camera controller 91 stops supply of electric power to the in-vehicle camera 11. After step S103, the present control routine is terminated.

Meanwhile, in a case where the camera controller 91 determines that the number of passengers is two or more in step S102, the present control routine proceeds to step S104. In step S104, the camera controller 91 causes the in-vehicle camera 11 to operate. As a result, the in-vehicle camera 11 images the passenger of the vehicle 1 to generate an image. The image generated by the in-vehicle camera 11 is transmitted to the server 2 and is stored in the storage device 22 of the server 2. Note that, the image generated by the in-vehicle camera 11 may be temporarily stored in the memory 72 of the ECU 70. After step S104, the present control routine is terminated.

In the present control routine, the camera controller 91 stops the operation of the in-vehicle camera 11 in a case where the number of passengers is zero (that is, in case where there is no passenger in vehicle 1). Accordingly, it is possible to reduce power consumption caused by the operation of the in-vehicle camera 11. However, the camera controller 91 may cause the in-vehicle camera 11 to operate in a case where there is no passenger in the vehicle 1 for the purpose of monitoring the state of the inside of the vehicle 1. In this case, the camera controller 91 determines whether the number of passengers is one or not in step S102.

In addition, the camera controller 91 may transmit the operating state of the in-vehicle camera 11 to the passenger of the vehicle 1. In this case, the passenger can confirm the operating state of the in-vehicle camera 11 and thus it is possible to enhance the sense of security of the passenger. In this case, for example, the camera controller 91 transmits the operating state of the in-vehicle camera 11 to the passenger of the vehicle 1 via an output device such as the HMI 87 or the portable terminal 3. Note that, the camera controller 91 may transmit the operating state of the in-vehicle camera 11 to the passenger of the vehicle 1 by turning on a light emitting device (for example, LED) in the vicinity of the in-vehicle camera 11 when the in-vehicle camera 11 is being operated.

In addition, the camera controller 91 may cause an image generated by the in-vehicle camera 11 (hereinafter, referred to as "generated image") to be displayed to the passenger of the vehicle 1 when the camera controller 91 causes the in-vehicle camera 11 to operate. Accordingly, it is possible to make the passenger recognize that the passenger is being monitored and thus it is possible to suppress an immoral behavior of the passenger.

In this case, for example, the camera controller 91 transmits the generated image to the HMI 87 via the in-vehicle network and causes the generated image to be displayed to the passenger o the vehicle 1 via the HMI 87. Note that, the camera controller 91 may transmit the generated image to the portable terminal 3 via the communication network 5 and the server 2 or transmit the generated image to the portable terminal 3 through wireless communication and cause the generated image to be displayed to the passenger of the vehicle 1 via the portable terminal 3. In addition, the camera controller 91 may cause the generated image to be displayed to the passenger of the vehicle 1 via an output device other than the HMI 87 provided in the vehicle 1.

Second Embodiment

The configurations and control of a passenger transportation system and a vehicle according to a second embodiment are basically the same as those in the first embodiment except for a point described as follow. Therefore, the second embodiment of the present disclosure will be described while focusing on a difference between the first embodiment and the second embodiment.

In the case of the mobility service, the user may use the vehicle 1 together with an acquaintance (for example, family, friend, colleague, or like). In this case, a possibility of a trouble between passengers is low unlike a case where persons who do not know each other use the vehicle 1.

Therefore, in the second embodiment, the passenger information detection unit 92 measures the number of users who have issued the vehicle allocation request and are present in the vehicle 1 (hereinafter, "number of users"). In addition, the camera controller 91 stops the operation of the in-vehicle camera 11 in a case where the number of users is one and causes the in-vehicle camera 11 to operate in a case where the number of users is two or more. Accordingly, it is possible to enhance protection of the privacy of the passenger while securing the safety of the passenger.

Camera Control

Figure 6:
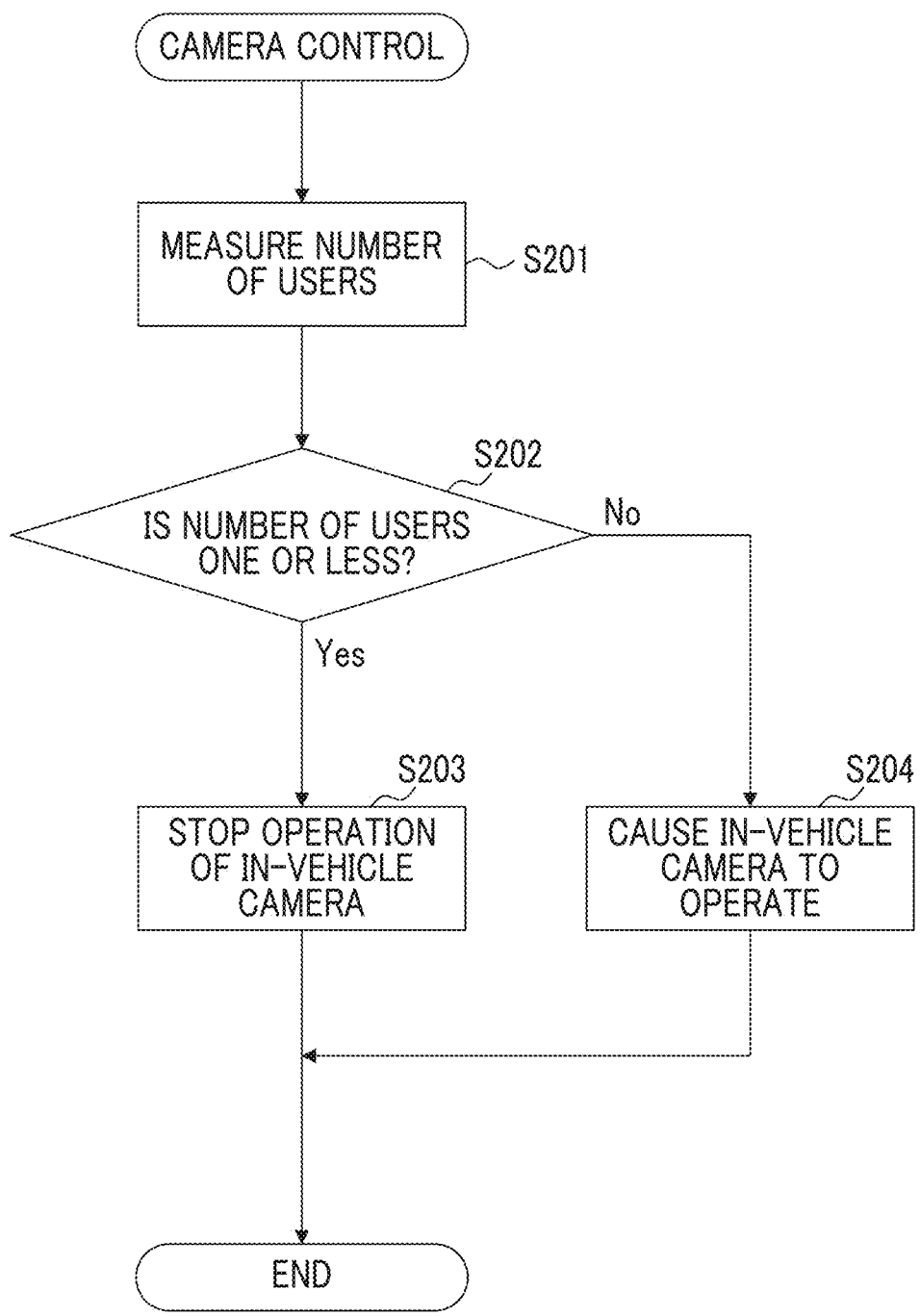
FIG. 6 is a flowchart illustrating a control routine of camera control in a second embodiment.

FIG. 6 is a flowchart illustrating a control routine of camera control in the second embodiment. The present control routine is repeatedly performed by the ECU 70 at predetermined intervals.

First, in step S201, the passenger information detection unit 92 measures the number of users. For example, the passenger information detection unit 92 measures the number of users based on the user identification information read by the information reader of the in-vehicle state detection device 83. In addition, for each user, the pick-up point and the destination included in the request information which is input to the portable terminal 3 by the user are transmitted to the vehicle 1 as the vehicle allocation information. Therefore, the passenger information detection unit 92 may measure the number of users based on the vehicle allocation information transmitted to the vehicle 1 and the current position of the vehicle 1 which is detected by the GPS receiver 84.

Next, in step S202, the camera controller 91 determines whether the number of users measured by the passenger information detection unit 92 is one or less. In a case where the camera controller 91 determines that the number of users is one or less, the present control routine proceeds to step S203. In step S203, the camera controller 91 stops the operation of the in-vehicle camera 11 as with step S103 in FIG. 5. After step S203, the present control routine is terminated.

Meanwhile, in a case where the camera controller 91 determines that the number of users is two or more in step S202, the present control routine proceeds to step S204. In step S204, the camera controller 91 causes the in-vehicle camera 11 to operate as with step S104 in FIG. 5. After step S204, the present control routine is terminated.

Note that, the control routine in FIG. 6 can be modified in the same manner as that of the control routine in FIG. 5.

Third Embodiment

The configurations and control of a passenger transportation system and a vehicle according to a third embodiment are basically the same as those in the first embodiment except for a point described as follow. Therefore, the third embodiment of the present disclosure will be described while focusing on a difference between the first embodiment and the third embodiment.

Figure 7:
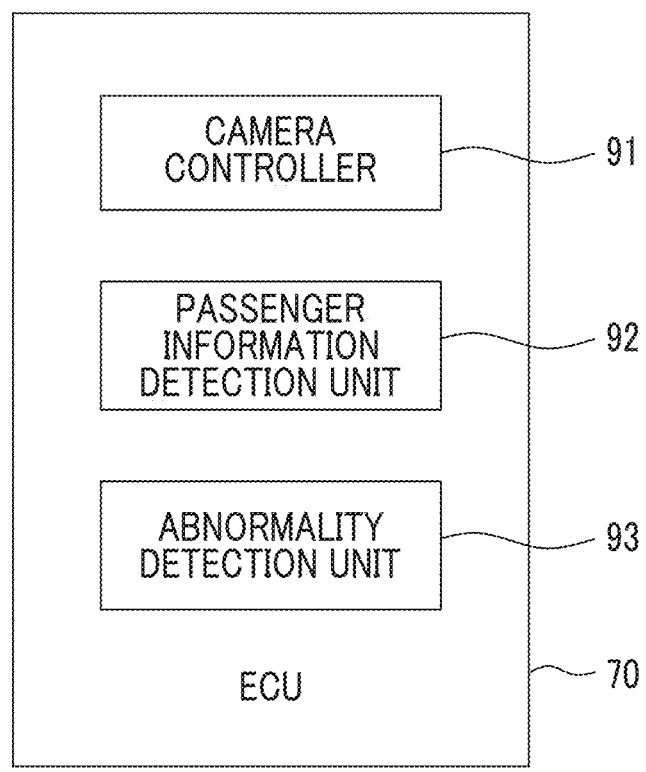
FIG. 7 is a functional block diagram of an ECU of a vehicle according to a third embodiment.

FIG. 7 is a functional block diagram of the ECU 70 of the vehicle 1 according to the third embodiment. In the third embodiment, the ECU 70 includes an abnormality detection unit 93 in addition to the camera controller 91 and the passenger information detection unit 92. The abnormality detection unit 93 detects an abnormality about the vehicle 1 or the passenger of the vehicle 1. The camera controller 91, the passenger information detection unit 92, and the abnormality detection unit 93 are functional blocks that are realized when the processor 73 of the ECU 70 executes a program stored in the memory 72 of the ECU 70.

In addition, in the third embodiment, the in-vehicle state detection device 83 further includes a sound volume measurer and a vibration detector. The sound volume measurer is provided in the vehicle 1 and measures the volume of sound in a vehicle cabin. The vibration detector is detected in the vehicle 1 and measures the level of vibration in the vehicle cabin.

As described above, in a case where the vehicle 1 is used by one passenger, a possibility that the passenger is harmed due to a cause other than an accident of the vehicle 1 is extremely low. However, there is a possibility that the passenger performs an immoral behavior in the vehicle 1. For example, a malfunction of an in-vehicle machine (for example, HMI 87) due to a violent operation, a noise to the vicinity of the vehicle 1, a dangerous behavior (for example, walking in vehicle), and the like may cause problems.

Therefore, in the third embodiment, in a case where the abnormality detection unit 93 detects an abnormality about the vehicle 1 or the passenger, the camera controller 91 terminates stoppage of the operation of the in-vehicle camera 11. In other words, in a case where the abnormality detection unit 93 detects an abnormality about the vehicle 1 or the passenger, the camera controller 91 causes the in-vehicle camera 11 to operate again. Accordingly, it is possible to suppress an immoral behavior of the passenger and it is possible to keep an evidence of an immoral behavior in the form of an image.

Abnormality Detection Process

Figure 8:
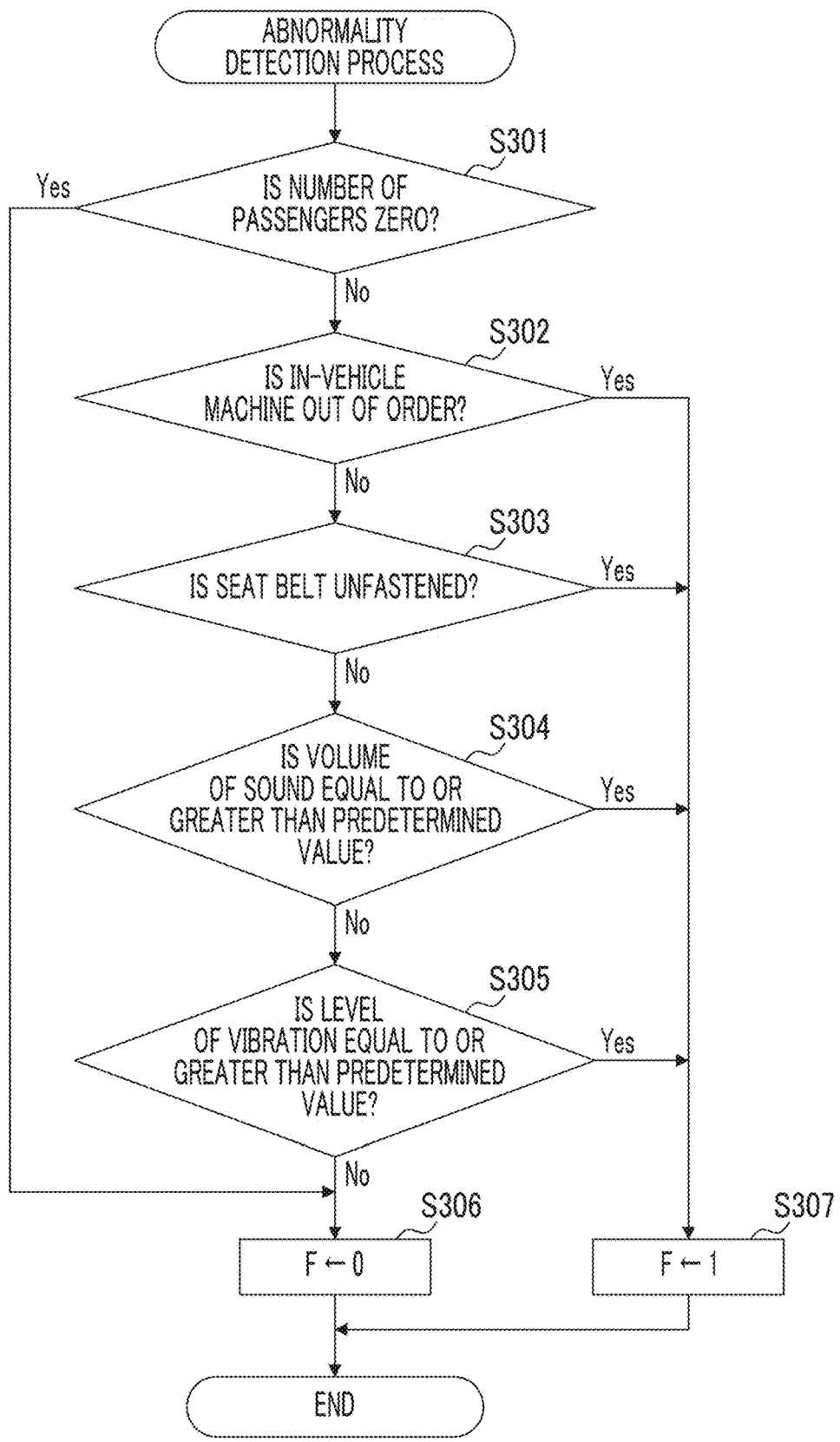
FIG. 8 is a flowchart illustrating a control routine of an abnormality detection process in the third embodiment.

FIG. 8 is a flowchart illustrating a control routine of an abnormality detection process in the third embodiment. The present control routine is repeatedly performed by the ECU 70 at predetermined intervals.

First, in step S301, the abnormality detection unit 93 determines whether the number of passengers is zero or not. In a case where the abnormality detection unit 93 determines that the number of passengers is zero, the present control routine proceeds to step S306. In step S306, the abnormality detection unit 93 resets an abnormality flag F to "0". The abnormality flag F is a flag that is set to "1" in a case where an abnormality about the vehicle or the passenger is detected and is set to "0" in a case where an abnormality about the vehicle or the passenger is not detected. After step S306, the present control routine is terminated.

Meanwhile, in a case where the abnormality detection unit 93 determines that the number of passengers is one or more in step S301, the present control routine proceeds to step S302. In step S302, the abnormality detection unit 93 determines whether an in-vehicle machine of the vehicle 1 is out of order. For example, the abnormality detection unit 93 detects a malfunction of each in-vehicle machine of the vehicle 1 with a known self-diagnostic function (on-board diagnostics (OBD)) mounted in the vehicle 1. In a case where the abnormality detection unit 93 determines that the in-vehicle machine of the vehicle 1 is not out of order in step S302, the present control routine proceeds to step S303.

In step S303, the abnormality detection unit 93 determines whether a seat belt is unfastened or not based on the output of the seat belt sensor of the in-vehicle state detection device 83. In a case where the abnormality detection unit 93 determines that the seat belt is not unfastened, the present control routine proceeds to step S304.

In step S304, the abnormality detection unit 93 determines whether the volume of sound in the vehicle cabin is equal to or greater than a predetermined value or not based on the output of the sound volume measurer of the in-vehicle state detection device 83. For example, the abnormality detection unit 93 determines whether the maximum value or the average value of the volume of sound in a predetermined period of time up to a current time is equal to or greater than the predetermined value or not. In a case where the abnormality detection unit 93 determines that the volume of sound in the vehicle cabin is smaller than the predetermined value, the present control routine proceeds to step S305.

In step S305, the abnormality detection unit 93 determines whether the level of vibration in the vehicle cabin is equal to or greater than a predetermined value or not based on the output of the in-vehicle state detection device 83. For example, the abnormality detection unit 93 determines whether the maximum value or the average value of the level of vibration in a predetermined period of time up to a current time is equal to or greater than the predetermined value or not. In a case where the abnormality detection unit 93 determines that the level of vibration in the vehicle cabin is smaller than the predetermined value, the present control routine proceeds to step S306.

In step S306, the abnormality detection unit 93 resets the abnormality flag F to "0". After step S306, the present control routine is terminated.

Meanwhile, in a case where the abnormality detection unit 93 determines that the in-vehicle machine of the vehicle 1 is out of order in step S302, an abnormality about the vehicle 1 is detected and the present control routine proceeds to step S307. In addition, in a case where the abnormality detection unit 93 determines that the seat belt is unfastened in step S303, an abnormality about the passenger is detected and the present control routine proceeds to step S307. In addition, in a case where the abnormality detection unit 93 determines that the volume of sound in the vehicle cabin is equal to or greater than the predetermined value in step S304, an abnormality about the passenger is detected and the present control routine proceeds to step S307. In addition, in a case where the abnormality detection unit 93 determines that the level of vibration in the vehicle cabin is equal to or greater than the predetermined value in step S305, an abnormality about the passenger is detected and the present control routine proceeds to step S307.

In step S307, the abnormality detection unit 93 sets the abnormality flag F to "1". After step S307, the present control routine is terminated. Note that, three or less of steps S302 to S305 may be randomly omitted.

Camera Control

Figure 9:
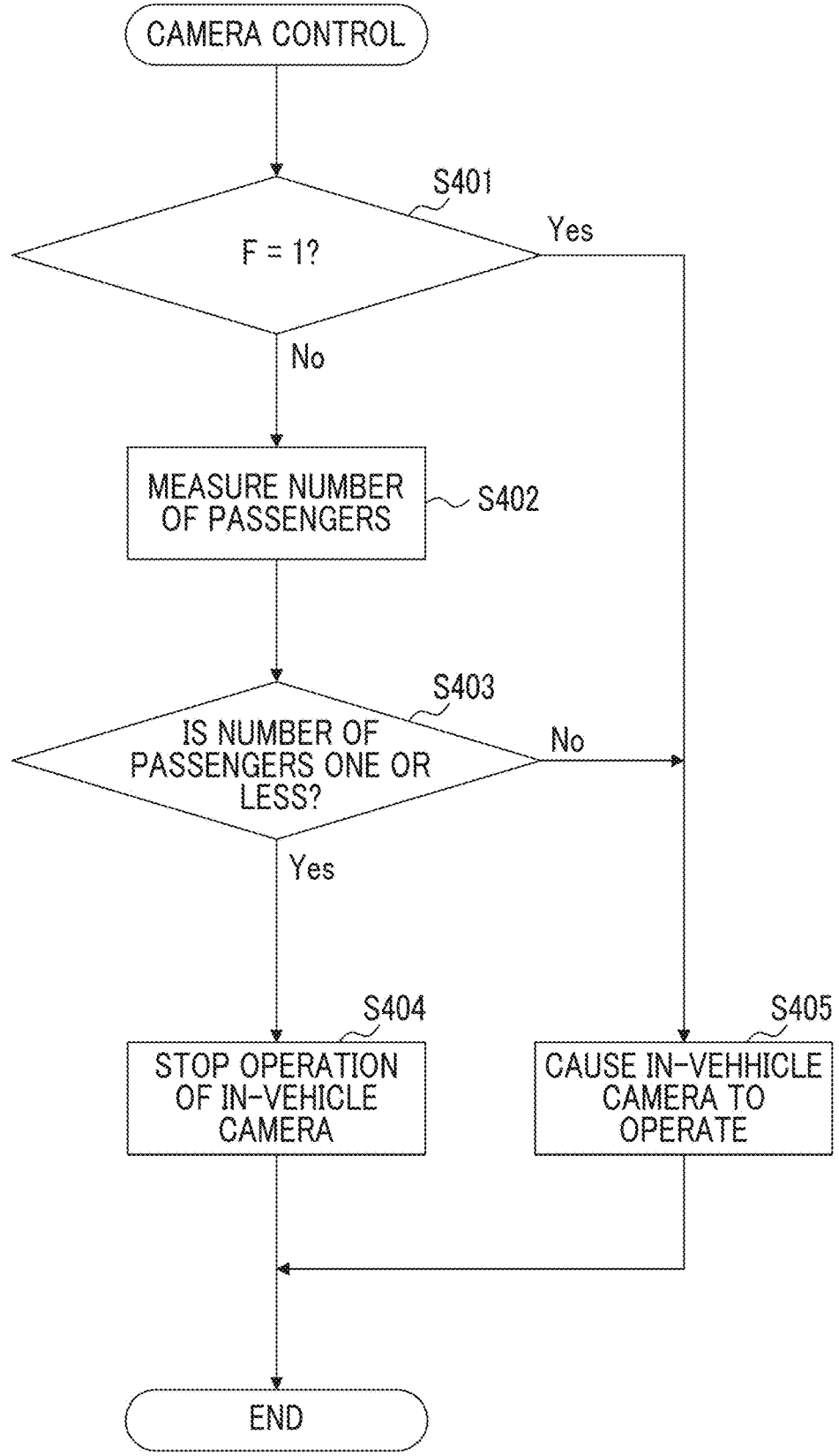
FIG. 9 is a flowchart illustrating a control routine of camera control in the third embodiment.

FIG. 9 is a flowchart illustrating a control routine of camera control in the third embodiment. The present control routine is repeatedly performed by the ECU 70 at predetermined intervals.

First, in step S401, the camera controller 91 determines whether the abnormality flag F is "1" or not. In a case where the camera controller 91 determines that the abnormality flag F is "1", the present control routine proceeds to step S405. In step S405, the camera controller 91 causes the in-vehicle camera 11I to operate as with step S104 in FIG. 5. After step S405, the present control routine is terminated.

Meanwhile, in a case where the camera controller 91 determines that the abnormality flag F is "0" in step S401, the present control routine proceeds to step S402. Since steps S402 to S405 are the same as steps S101 to S104 in FIG. 5, description thereof will be omitted. Note that, the control routine in FIG. 9 can be modified in the same manner as that of the control routine in FIG. 5.

Fourth Embodiment

The configurations and control of a passenger transportation system and a vehicle according to a fourth embodiment are basically the same as those in the first embodiment except for a point described as follow. Therefore, the fourth embodiment of the present disclosure will be described while focusing on a difference between the first embodiment and the fourth embodiment.

As described above, even in a case where the vehicle 1 is used by one passenger, there is a possibility that the passenger performs an immoral behavior in the vehicle 1. Therefore, it is desirable that the passenger is caused to approve stoppage of the operation of the in-vehicle camera 11 such that the passenger takes responsibility for a behavior of the passenger during a period in which the in-vehicle camera 11 does not operate. In addition, the passenger may want to be monitored by the in-vehicle camera 11 in order to prove that the passenger is not related to a malfunction of an in-vehicle machine or the like.

Therefore, in the fourth embodiment, the camera controller 91 stops the operation of the in-vehicle camera 11 in a case where the number of passengers is one and the passenger approves stoppage of the operation of the in-vehicle camera 11. Accordingly, it is possible to suppress an immoral behavior of the passenger and it is possible to realize a monitoring situation meeting the demands of the passenger.

Camera Control

Figure 10:
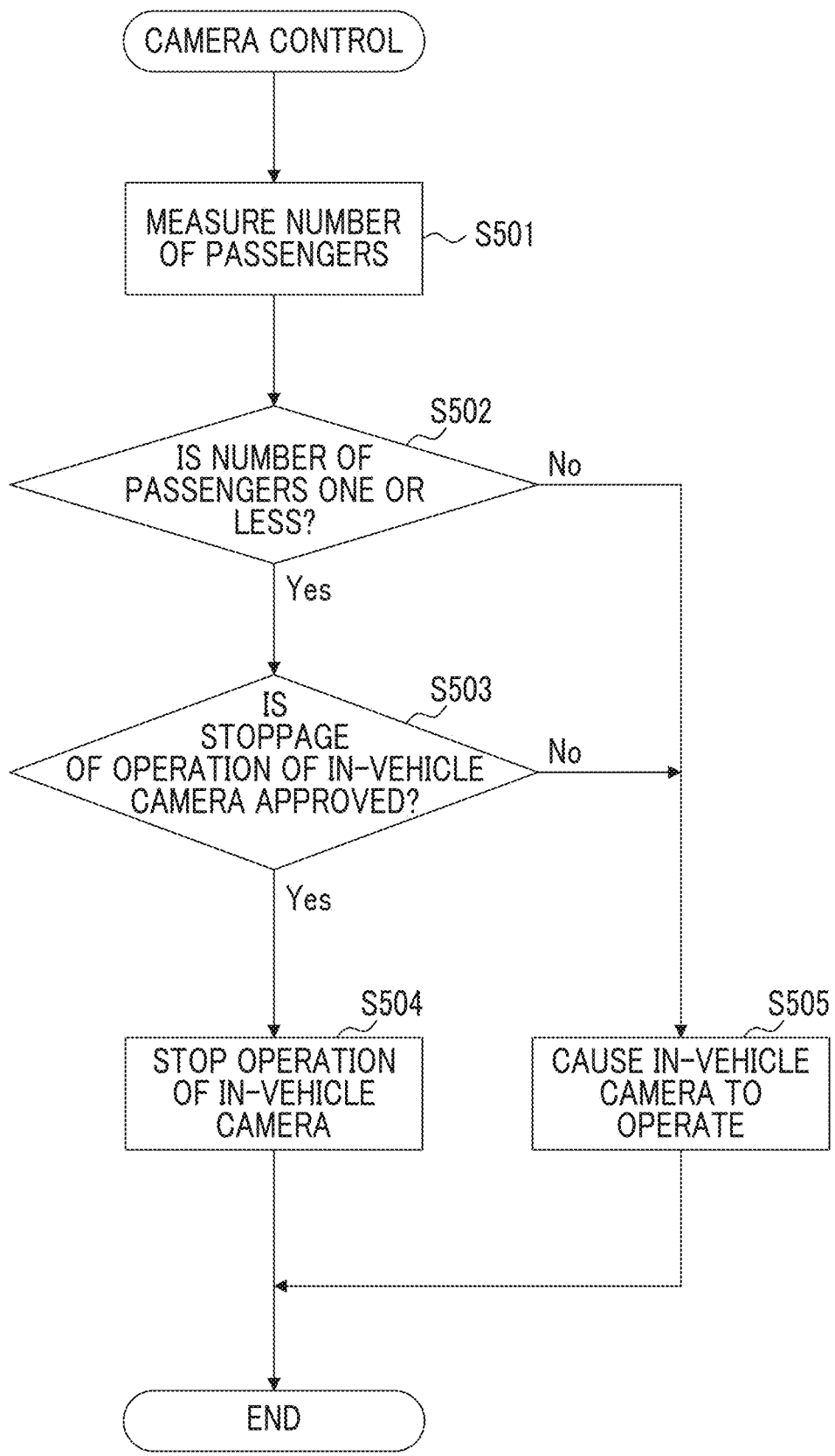
FIG. 10 is a flowchart illustrating a control routine of camera control in a fourth embodiment.

FIG. 10 is a flowchart illustrating a control routine of camera control in the fourth embodiment. The present control routine is repeatedly performed by the ECU 70 at predetermined intervals.

First, in step S501, the passenger information detection unit 92 measures the number of passengers as with step S101 in FIG. 5. Next, in step S502, the camera controller 91 determines whether the number of passengers measured by the passenger information detection unit 92 is one or less. In a case where the camera controller 91 determines that the number of passengers is one or less, the present control routine proceeds to step S503.

In step S503, the camera controller 91 determines whether the passenger of the vehicle 1 has approved stoppage of the operation of the in-vehicle camera 11. For example, whether there is an approval or not is selected when the user inputs the request information to the portable terminal 3 and information about whether there is an approval or not is transmitted to the vehicle 1 as the vehicle allocation information. In this case, the camera controller 91 determines whether the passenger of the vehicle 1 has approved stoppage of the operation of the in-vehicle camera 11 based on the vehicle allocation information transmitted to the vehicle 1. Note that, the passenger may select whether to approve the stoppage or not via the HMI 87 of the vehicle 1. In this case, the camera controller 91 determines whether the passenger of the vehicle 1 has approved stoppage of the operation of the in-vehicle camera 11 based on the input to the HMI 87.

In a case where the camera controller 91 determines that the passenger of the vehicle 1 has approved stoppage of the operation of the in-vehicle camera 11 in step S503, the present control routine proceeds to step S504. In step S504, the camera controller 91 stops the operation of the in-vehicle camera 11 as with step S103 in FIG. 5. After step S504, the present control routine is terminated.

Meanwhile, in a case where the camera controller 91 determines that the number of passengers is two or more in step S502 or in a case where the camera controller 91 determines that the passenger of the vehicle 1 has not approved stoppage of the operation of the in-vehicle camera 11 in step S503, the present control routine proceeds to step S505. In step S505, the camera controller 91 causes the in-vehicle camera 11 to operate as with step S104 in FIG. 5. After step S505, the present control routine is terminated.

Note that, the control routine in FIG. 10 can be modified in the same manner as that of the control routine in FIG. 5.

Hereinabove, particular embodiments of the disclosure have been described. However, the disclosure is not limited to the above-described embodiments and various corrections and modifications can be made without departing from the description in the claims. For example, a method of detecting an abnormality about a vehicle or a passenger is not limited to the above-described method.

In addition, the above-described embodiments can be implemented by being combined randomly. For example, in a case where the third embodiment and the fourth embodiment are combined with each other, step S503 in FIG. 10 is performed between step S403 and step S404 of the control routine in FIG. 9, in the third embodiment. In addition, in a case where the second embodiment and the third embodiment, the control routine in FIG. 8 is performed and step S401 in FIG. 9 is performed before step S201 in the control routine in FIG. 6, in the second embodiment.

In addition, in a case where the second embodiment and the fourth embodiment are combined with each other, step S503 in FIG. 10 is performed between step S202 and step S203 in FIG. 6. In this case, in step S503, the camera controller 91 determines whether a user who has issued the vehicle allocation request and is present in the vehicle 1 has approved stoppage of the operation of the in-vehicle camera 11 or not based on the vehicle allocation information or the input to the HMI 87.

In addition, in a case where the second embodiment, the third embodiment, and the fourth embodiment are combined with each other, the control routine in FIG. 8 is performed, step S401 in FIG. 9 is performed before step S201 in the control routine in FIG. 6, and step S503 in FIG. 10 is performed between step S202 and step S203 in FIG. 6, in the second embodiment.

What is claimed is:

1. A vehicle which is configured to transport at least one passenger through autonomous travel, the vehicle comprising:

an in-vehicle camera configured to image the at least one passenger to generate an image;
a camera controller configured to control the in-vehicle camera; and
an electronic control unit configured to detect information about the at least one passenger, wherein:
the electronic control unit measures a number of users who have issued a vehicle allocation request among the at least one passenger; and
the camera controller stops an operation of the in-vehicle camera in a case where the number of users who have issued the vehicle allocation request is one.

2. The vehicle according to claim 1, wherein the electronic control unit is configured to detect an abnormality about the vehicle or the at least one passenger; and
wherein the camera controller terminates the stoppage of the operation of the in-vehicle camera in a case where the electronic control unit detects the abnormality.

3. The vehicle according to claim 1, wherein the camera controller transmits an operating state of the in-vehicle camera.

4. The vehicle according to claim 1, wherein the camera controller causes the image generated by the in-vehicle camera to be displayed when the camera controller causes the in-vehicle camera to operate.

5. The vehicle according to claim 1, wherein a user of the number of users issues the vehicle allocation request by inputting request information into a terminal of the user.

6. A passenger transportation system comprising:
a server configured to create a traveling plan based on a vehicle allocation request from a user;
a vehicle configured to autonomously travel based on the traveling plan;
an in-vehicle camera configured to image at least one passenger of the vehicle to generate an image, the in-vehicle camera being provided in the vehicle;
a camera controller configured to control the in-vehicle camera; and
an electronic control unit configured to detect information about the at least one passenger, wherein:
the electronic control unit measures a number of users who have issued a vehicle allocation request among the at least one passenger; and
the camera controller stops an operation of the in-vehicle camera in a case where the number of users who have issued the vehicle allocation request is one.

* * * * *